(12) United States Patent
Lutnick et al.

(10) Patent No.: US 11,663,667 B2
(45) Date of Patent: *May 30, 2023

(54) REVERSE CONVERTIBLE FINANCIAL INSTRUMENT

(71) Applicant: CFPH, LLC, New York, NY (US)

(72) Inventors: Howard W. Lutnick, New York, NY (US); Jonathan Rein, New York, NY (US)

(73) Assignee: CFPH, LLC, New York, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/157,844

(22) Filed: Jan. 25, 2021

(65) Prior Publication Data

US 2021/0224914 A1    Jul. 22, 2021

Related U.S. Application Data

(63) Continuation of application No. 16/164,163, filed on Oct. 18, 2018, now Pat. No. 10,902,519, which is a
(Continued)

(51) Int. Cl.
*G06Q 40/06* (2012.01)
*G06Q 40/02* (2023.01)
*G06Q 40/04* (2012.01)

(52) U.S. Cl.
CPC ............ *G06Q 40/06* (2013.01); *G06Q 40/02* (2013.01); *G06Q 40/04* (2013.01)

(58) Field of Classification Search
CPC ......... G06Q 40/06; G06Q 40/02; G06Q 40/04
See application file for complete search history.

(56) References Cited

U.S. PATENT DOCUMENTS 7,257,556 B1 *  8/2007  Rifkin .............. G06Q 40/00
                                                705/36 R
7,493,278 B2 *  2/2009  Jones ............... G06Q 40/00
                                                705/36 R
(Continued)

FOREIGN PATENT DOCUMENTS

WO    WO -2004029781    4/2004
WO    WO 2005/060469    7/2005
(Continued)

OTHER PUBLICATIONS

Aziz et al.: Equity-Based, Asset-Based and Asset-Backed Transactional Structures in Shari'a-Compliant Financing: Reflections on the Current Financial Crisis, Sep. 2009, Economic Papers, The Economic Society of Australia, vol. 28,, No. 3, pp. 270-279 (Year: 2009).*
(Continued)

*Primary Examiner* — Bijendra K Shrestha

(57) ABSTRACT

Methods and systems are provided herewith for providing a financial instrument. In some embodiments, a processor may receive one or more performance parameters for determining a performance of an asset at one or more future times are received from one or more parties. The processor may receive a request to generate indicia of a financial instrument. The financial instrument may comprise a funding instrument that specifies rights and obligations of at least a first party and a second party respecting a funding contribution from the first party for funding an asset owned at least in part by the second party. The processor may determine a plurality of possible measurements of a future performance of the asset based at least in part on the received performance parameters. The processor may determine a conversion schedule for converting at least a portion of the first user's rights in the financial instrument into an equity component of the asset. The conversion schedule may
(Continued)

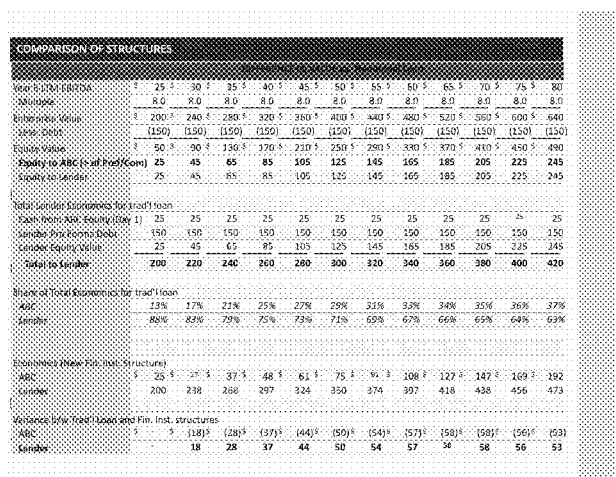

specify a possible post-conversion equity component for each of the plurality of possible performance measurements. In some embodiments, the conversion schedule may specify a greater possible post-conversion equity component for a greater possible performance measurement. The processor may transmit the conversion schedule to the second party.

16 Claims, 4 Drawing Sheets

Related U.S. Application Data continuation of application No. 13/092,818, filed on Apr. 22, 2011, now Pat. No. 10,109,011.

(60) Provisional application No. 61/327,100, filed on Apr. 22, 2010.

(56) References Cited

U.S. PATENT DOCUMENTS

| | | | |
|---|---|---|---|
| 7,644,025 B2 * | 1/2010 | Ortner | G06Q 40/04 705/36 R |
| 7,848,998 B1 * | 12/2010 | Dhalla | G06Q 40/04 705/37 |
| 7,899,724 B1 * | 3/2011 | Savasoglu | G06Q 40/04 705/36 R |
| 10,109,011 B1 | 10/2018 | Lutnick et al. | |
| 2003/0004809 A1 * | 1/2003 | Palcic | G06Q 40/04 705/14.18 |
| 2004/0098327 A1 * | 5/2004 | Seaman | G06Q 40/04 705/36 R |
| 2005/0228747 A1 * | 10/2005 | Gumport | G06Q 40/00 705/37 |
| 2007/0106579 A1 * | 5/2007 | Al-Saleh | G06Q 40/00 705/35 |
| 2007/0106588 A1 * | 5/2007 | Kulak | G06Q 40/06 705/36 R |
| 2007/0174210 A1 * | 7/2007 | Zajkowski | G06Q 40/06 705/36 R |

FOREIGN PATENT DOCUMENTS

| | | | |
|---|---|---|---|
| WO | WO -2005114512 | 12/2005 | |
| WO | WO-2005114512 A1 * | 12/2005 | G06Q 40/02 |

OTHER PUBLICATIONS

Gillet, Roland: The Consequence of Issuing Convertoble Bonds: Dilution and/or Restructuring? Jun. 2008, University of Paris, France, pp. 1-58 (Year: 2008).*

Moody's Investors Service: Distressed Exchanges in Europe, Sep. 2002, pp. 1-8 (Year: 2002).*

Danielova et al.:What motivates exchangeable debt offerings? 2010, Journal of Corporate Finance 16, pp. 159-169 (Year: 2010).*

Manaligod, Ma. Gina T.: Debt Restructuring; alternatives and implications, Jan.-Feb. 2005, Notes on Business and Education, vol. 8, No. 1, pp. 1-6. (Year: 2005).

Danielova et al.: What motivates exchangeable debt offerings? 2010, Journal of Corporate Finance, pp. 159-169 (Year:2010).

* cited by examiner

FIG. 1

EFFECTIVE COUPON

| ELIGIBLE | COUPON |
|---|---|
| ≤ $25 million | 2.50% |
| 25 - 30 | 2.75 |
| 30 - 35 | 3.00 |
| 35 - 40 | 3.25 |
| 40 - 45 | 3.50 |
| 45 - 50 | 3.75 |
| 50 - 55 | 4.00 |
| 55 - 60 | 4.25 |
| 60 - 65 | 4.50 |
| 65 - 70 | 4.75 |
| 70 - 75 | 5.00 |
| > 75 | 5.25 |

FIG. 2

CONVERSION TEST

- The RMC Loan will face a test at the conclusion of 5 years (the RMC Loan Measurement Date)
- Based on the performance of the Company, some portion of the loan may convert into common equity (held by Lender)
- Conversion of RMC Loan to common equity serves to dilute the ABC stake (subject to preference of initial investment (e.g., $25 Million)

| EBITDA | DEBT | | | EQUITY | | |
|---|---|---|---|---|---|---|
| | INITIAL | CONVERSION | POST CONVERSION | INITIAL | CONVERSION | POST CONVERSION |
| > $75 million | $400 | 0 | $400 | 20% | 0 | 20% |
| 70 - 75 | 400 | (25) | 375 | 20 | 5 | 25 |
| 65 - 70 | 400 | (50) | 350 | 20 | 10 | 30 |
| 60 - 65 | 400 | (75) | 325 | 20 | 15 | 35 |
| 55 - 60 | 400 | (100) | 300 | 20 | 20 | 40 |
| 50 - 55 | 400 | (125) | 275 | 20 | 25 | 45 |
| 45 - 50 | 400 | (150) | 250 | 20 | 30 | 50 |
| 40 - 45 | 400 | (175) | 225 | 20 | 35 | 55 |
| 35 - 40 | 400 | (200) | 200 | 20 | 40 | 60 |
| 30 - 35 | 400 | (225) | 175 | 20 | 45 | 65 |
| 25 - 30 | 400 | (250) | 150 | 20 | 50 | 70 |
| ≤ $25 million | 400 | (275) | 125 | 20 | 55 | 75 |

FIG. 3

| VALUATION AT VARIOUS BREAKPOINTS | | | | | | | | | | | | | |
|---|---|---|---|---|---|---|---|---|---|---|---|---|---|
| | | VALUE TO ABC AND TO LENDER | | | | | | | | | | | |
| Year 5 LTM EBITDA | $ 25 | $ 30 | $ 35 | $ 40 | $ 45 | $ 50 | $ 55 | $ 60 | $ 65 | $ 70 | $ 75 | $ 80 |
| Multiple | 8.0 | 8.0 | 8.0 | 8.0 | 8.0 | 8.0 | 8.0 | 8.0 | 8.0 | 8.0 | 8.0 | 8.0 |
| Enterprise Value | $ 200 | $ 240 | $ 280 | $ 320 | $ 360 | $ 400 | $ 440 | $ 480 | $ 520 | $ 560 | $ 600 | $ 640 |
| Less: Debt | (125) | (150) | (175) | (200) | (225) | (250) | (275) | (300) | (325) | (350) | (375) | (400) |
| Equity Value | $ 75 | $ 90 | $ 105 | $ 120 | $ 135 | $ 150 | $ 165 | $ 180 | $ 195 | $ 210 | $ 225 | $ 240 |
| Equity to ABC (> of Pref/Com) | 25 | 27 | 37 | 48 | 61 | 75 | 91 | 108 | 127 | 147 | 169 | 192 |
| Equity to Lender | 50 | 63 | 68 | 72 | 74 | 75 | 74 | 72 | 68 | 63 | 56 | 48 |
| Total Lender Economics | | | | | | | | | | | | |
| Cash from ABC Equity (Day 1) | 25 | 25 | 25 | 25 | 25 | 25 | 25 | 25 | 25 | 25 | 25 | 25 |
| Lender Pro Forma Debt | 125 | 150 | 175 | 200 | 225 | 250 | 275 | 300 | 325 | 350 | 375 | 400 |
| Lender Equity Value | 50 | 63 | 68 | 72 | 74 | 75 | 74 | 72 | 68 | 63 | 56 | 48 |
| Total to Lender | 200 | 238 | 268 | 297 | 324 | 350 | 374 | 397 | 418 | 438 | 456 | 473 |
| Share of Total Economics | | | | | | | | | | | | |
| ABC | 11% | 10% | 12% | 14% | 16% | 18% | 20% | 21% | 23% | 25% | 27% | 29% |
| Lender | 89% | 90% | 88% | 86% | 84% | 82% | 80% | 79% | 77% | 75% | 73% | 71% |

FIG. 4

COMPARISON OF STRUCTURES

| | | | | | | | | | | DIFFERENCE IN VALUE vs. Traditional loan | | | | | |
|---|---|---|---|---|---|---|---|---|---|---|---|---|---|---|---|
| Year 5 LTM EBITDA | $ | 25 | $ 30 | $ 35 | $ 40 | $ 45 | $ 50 | $ 55 | $ 60 | $ 65 | $ 70 | $ 75 | $ 80 |
| Multiple | | 8.0 | 8.0 | 8.0 | 8.0 | 8.0 | 8.0 | 8.0 | 8.0 | 8.0 | 8.0 | 8.0 | 8.0 |
| Enterprise Value | $ | 200 | $ 240 | $ 280 | $ 320 | $ 360 | $ 400 | $ 440 | $ 480 | $ 520 | $ 560 | $ 600 | $ 640 |
| Less: Debt | | (150) | (150) | (150) | (150) | (150) | (150) | (150) | (150) | (150) | (150) | (150) | (150) |
| Equity Value | $ | 50 | $ 90 | $ 130 | $ 170 | $ 210 | $ 250 | $ 290 | $ 330 | $ 370 | $ 410 | $ 450 | $ 490 |
| Equity to ABC (> of Pref/Com) | | 25 | 45 | 65 | 85 | 105 | 125 | 145 | 165 | 185 | 205 | 225 | 245 |
| Equity to Lender | | 25 | 45 | 65 | 85 | 105 | 125 | 145 | 165 | 185 | 205 | 225 | 245 |
| Total Lender Economics for trad'l loan | | | | | | | | | | | | | |
| Cash from ABC Equity (Day 1) | | 25 | 25 | 25 | 25 | 25 | 25 | 25 | 25 | 25 | 25 | 25 | 25 |
| Lender Pro Forma Debt | | 150 | 150 | 150 | 150 | 150 | 150 | 150 | 150 | 150 | 150 | 150 | 150 |
| Lender Equity Value | | 25 | 45 | 65 | 85 | 105 | 125 | 145 | 165 | 185 | 205 | 225 | 245 |
| Total to Lender | | 200 | 220 | 240 | 260 | 280 | 300 | 320 | 340 | 360 | 380 | 400 | 420 |
| Share of Total Economics for trad'l loan | | | | | | | | | | | | | |
| ABC | | 13% | 17% | 21% | 25% | 27% | 29% | 31% | 33% | 34% | 35% | 36% | 37% |
| Lender | | 88% | 83% | 79% | 75% | 73% | 71% | 69% | 67% | 66% | 65% | 64% | 63% |
| Economics (New Fin. Inst. Structure) | | | | | | | | | | | | | |
| ABC | $ | 25 | $ 27 | $ 37 | $ 48 | $ 61 | $ 75 | $ 91 | $ 108 | $ 127 | $ 147 | $ 169 | $ 192 |
| Lender | | 200 | 238 | 268 | 297 | 324 | 350 | 374 | 397 | 418 | 438 | 456 | 473 |
| Variance b/w Trad'l Loan and Fin. Inst. structures | | | | | | | | | | | | | |
| ABC | $ | - | $ (18) | $ (28) | $ (37) | $ (44) | $ (50) | $ (54) | $ (57) | $ (58) | $ (58) | $ (56) | $ (53) |
| Lender | | - | 18 | 28 | 37 | 44 | 50 | 54 | 57 | 58 | 58 | 56 | 53 |

REVERSE CONVERTIBLE FINANCIAL INSTRUMENT

RELATED APPLICATIONS

This application is a continuation of U.S. patent application Ser. No. 16/164,163 filed Oct. 18, 2018 which is a continuation of U.S. patent application Ser. No. 13/092,818 filed Apr. 22, 2011 (now U.S. Pat. No. 10,109,011 issued on Oct. 23, 2018) which claims the benefit of U.S. Provisional Application No. 61/327,100 filed Apr. 22, 2010, all of which are hereby incorporated by reference herein in their entirety.

FIELD OF THE INVENTION

Various embodiments of the present invention generally relate to creating, editing, displaying, and managing a financial instrument having debt and equity components.

BRIEF SUMMARY

Various embodiments of the present invention generally relate to creating, editing, displaying, and managing a financial instrument having debt and equity components. In some embodiments, a processor may receive one or more performance parameters for determining a performance of an asset at one or more future times are received from one or more parties. The processor may receive a request to generate indicia of a financial instrument. The financial instrument may comprise a funding instrument that specifies rights and obligations of at least a first party and a second party respecting a funding contribution from the first party for funding an asset owned at least in part by the second party. The processor may determine a plurality of possible measurements of a future performance of the asset based at least in part on the received performance parameters. The processor may determine a conversion schedule for converting at least a portion of the first user's rights in the financial instrument into an equity component of the asset. The conversion schedule may specify a possible post-conversion equity component for each of the plurality of possible performance measurements. In some embodiments, the conversion schedule may specify a greater possible post-conversion equity component for a greater possible performance measurement.

The processor may transmit the conversion schedule to the second party. The processor may receive indicia indicating that the first and second party agree to terms of the financial instrument. The processor may transmit to the second party a confirmation of acceptance of the financial instrument. After the act of transmitting the confirmation of acceptance, the processor may determine a measurement of the performance of the asset according to the terms of the financial instrument. The processor may determine a post-conversion amount based on the measured performance of the asset according to the conversion schedule. The processor may transmit to the second party indicia indicating that a contract comprising the financial instrument has been executed.

BRIEF DESCRIPTION OF THE FIGURES

FIG. 1 depicts an exemplary effective coupon for a financial instrument according to at least one embodiment of the systems and methods disclosed herein.

FIG. 2 depicts an exemplary conversion test for a financial instrument according to at least one embodiment of the systems and methods disclosed herein.

FIG. 3 depicts an exemplary valuation at various break points for a financial instrument according to at least one embodiment of the systems and methods disclosed herein.

FIG. 4 depicts an exemplary comparison of various financial transaction structures including a structure involving a financial instrument according to at least one embodiment of the systems and methods disclosed herein.

The following sections I-XI provide a guide to interpreting the present application.

I. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise.

The term "variation" of an invention means an embodiment of the invention, unless expressly specified otherwise.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates may things). (Indication can be used as a very broad term in claim language. For example: receiving an indication of a financial instrument.)

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may include or cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments may cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well.

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The terms "a", "an" and "the" refer to "one or more", unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". The phrase "based at least on" is equivalent to the phrase "based at least in part on". For example, the phrase "element A is calculated based on element B and element C" covers embodiments where element A is calculated as the product of B times C (in other words, A=B×C), embodiments where A is calculated as the sum of B plus C (in other words, A=B+C), embodiments where A is calculated as a product of B times C times D, embodiments where A is calculated as a sum of the square root of B plus C plus D times E, and so on.

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" modifies do not establish specific further limitations of the claim or otherwise restrict the meaning or scope of the claim.

The terms "e.g", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4, . . . 9, 10) and non-integers (e.g., 1.0031415926, 1.1, 1.2, . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), rendering into electronic format or digital representation, ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing, averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

The term "determining" may include "calculating". The term "calculating" should be understood to include performing one or more calculations. Calculating may include computing, processing, and/or deriving. Calculating may be performed by a computing device. For example, calculating a thing may include applying an algorithm to data by a computer processor and generating the thing as an output of the processor.

The term "determining" may include "referencing". The term "referencing" should be understood to include making one or more reference, e.g., to a thing. Referencing may include querying, accessing, selecting, choosing, reading, and/or looking-up. The act of referencing may be performed by a computing device. For example, referencing a thing may include reading a memory location in which the thing is stored by a processor.

The term "determining" may include "receiving". For example, receiving a thing may include taking in the thing. In some embodiments, receiving may include acts performed to take in a thing, such as operating a network interface through which the thing is taken in. In some embodiments, receiving may be performed without acts performed to take in the thing, such as in a direct memory write or a hard wired circuit. Receiving a thing may include receiving a thing from a remote source that may have calculated the thing.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. In some embodiments, such a plurality of computer-based devices may operate together to perform one step of a process such as is common in grid computing systems. In some embodiments, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internet) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology are not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. § 1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed invention is widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims that recite anything other than a statutory class shall be interpreted to recite purposes, benefits and possible uses of the claimed invention, and such preambles shall not be construed to limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device. Similarly, the second device is in communication with the first device if the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the WiFi Alliance, SAP, ATP, Bluetooth™, and TCP/IP, TDMA, CDMA, and 3G; and/or (iv) encrypted to ensure privacy or prevent fraud in any of a variety of ways well known in the art.

The term "database" refers to any electronically-stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "condition" means (1) a premise upon which the fulfillment of an agreement depends, or (2) something essential to the appearance or occurrence of something else.

The term "transaction" means (1) an exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®, Pentium®, or Centrino™, Atom™ or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application will be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference. Conversely, the definitions provided in this application should not be used to limit, define, or otherwise construe any term of any document incorporated herein by reference. The definitions set forth explicitly in this application are controlling notwithstanding the description of particular embodiments that may be incompatible with the definition(s).

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

DETAILED DESCRIPTION OF EXEMPLARY EMBODIMENTS

In some embodiments, a processor may receive one or more performance parameters for determining a performance of an asset at one or more future times are received from one or more parties. The processor may receive a request to generate indicia of a financial instrument. The financial instrument may comprise a funding instrument that specifies rights and obligations of at least a first party and a second party respecting a funding contribution from the first party for funding an asset owned at least in part by the second party. The processor may determine a plurality of possible measurements of a future performance of the asset based at least in part on the received performance parameters. The processor may determine a conversion schedule for converting at least a portion of the first user's rights in the financial instrument into an equity component of the asset. The conversion schedule may specify a possible post-conversion equity component for each of the plurality of possible performance measurements. In some embodiments, the conversion schedule may specify a greater possible post-conversion equity component for a greater possible performance measurement. The processor may transmit the conversion schedule to the second party.

In some embodiments, the processor may receive indicia indicating that the first and second party agree to terms of the financial instrument. The processor may transmit to the second party a confirmation of acceptance of the financial instrument. After the act of transmitting the confirmation of acceptance, the processor may determine a measurement of the performance of the asset according to the terms of the financial instrument. The processor may determine a post-conversion amount based on the measured performance of the asset according to the conversion schedule. The processor may transmit to the second party indicia indicating that a contract comprising the financial instrument has been executed.

In some embodiments, the processor may receive indicia indicating that the first and second party agree to terms of the financial instrument.

In some embodiments, the processor may transmit to the second party a confirmation of acceptance of the financial instrument.

In some embodiments, the processor may determine a measurement of the performance of the asset according to the terms of the financial instrument, e.g., after the act of transmitting the confirmation of acceptance.

In some embodiments, the processor may determine a post-conversion amount based on the measured performance of the asset according to the conversion schedule.

In some embodiments, the processor may transmit to the second party indicia indicating that a contract comprising the financial instrument has been executed.

In some embodiments, the conversion schedule may further indicate a future time upon which the future performance of the asset will be measured, e.g., according to terms of the financial instrument.

In some embodiments, the financial instrument may specify that the at least portion of the first user's rights automatically convert to a post-conversion equity component according to the conversion schedule if, e.g., at a future time, the asset satisfies a performance metric.

In some embodiments, the financial instrument may specify that the at least portion of the first user's rights convert to a post-conversion equity component according to the conversion schedule, e.g., if one or both of the following occur: (a) at a future time, the asset satisfies a performance metric and (b) the first user elects to convert the at least portion of the first user's rights into the post-conversion equity component.

In some embodiments, the financial instrument may specify that the at least portion of the first user's rights automatically convert to a post-conversion equity component according to the conversion schedule if, at a predetermined future time, the asset satisfies a performance metric.

In some embodiments, the financial instrument may specify that the at least portion of the first user's rights automatically convert to a post-conversion equity component according to the conversion schedule upon an occurrence of the asset satisfying a predetermined performance metric.

In some embodiments, the financial instrument may specify that the at least portion of the first user's rights automatically convert to a post-conversion equity component according to the conversion schedule upon an occurrence of one or more predetermined market conditions.

In some embodiments, the plurality of possible performance measurements may be based on potential measurements of the asset's earnings at one or more future times, the future times being determined prior to execution of a contract comprising the financial instrument.

In some embodiments, the financial instrument may comprise a loan component wherein the first party is a lender of funds and the second party is a borrower of the funds.

In some embodiments, the conversion schedule may further specify a post-conversion debt component owed by the second party to the first party after conversion.

In some embodiments, the post-conversion amounts may comprise different amounts of equity that may be converted from at least a portion of the loan component upon an election of the first party after an occurrence of a corresponding possible performance measurement.

In some embodiments, the post-conversion amounts may comprise different amounts of equity that will automatically be converted from at least a portion of the loan component as a result of an occurrence of a corresponding possible performance measurement.

In some embodiments, the equity component may comprise common stock in the asset.

In some embodiments, the equity component may comprise preferred stock in the asset.

In some embodiments, the equity component may comprise preferred stock in the asset. The preferred stock may be configured to receive dividend payments, e.g., from the second party (or another party) at one or more times after conversion, e.g., according to a payment schedule determined at the time of issuance of the preferred stock, or an earlier or later time (such as a time of specifying the financial instrument, or a time based on performance criteria and/or market conditions).

In some embodiments, the equity component may comprise preferred stock in the asset that is convertible at a conversion rate into common stock in the asset.

In some embodiments, the conversion rate may comprise a variable rate determined based at least in part on determined market conditions.

In some embodiments, the conversion rate may be determined based on a financial performance of the asset at a future time, e.g., EBITDA (or other earnings or profit metric), e.g., over a period of time (such as a prior year, month, or multiple years or months).

In some embodiments, the conversion rate may be fixed at a time of issuance of the preferred stock.

It should be appreciated that as discussed herein, a market condition may be any condition of the market, such as a value of an index, a reference interest rate or other financial rate (e.g., LIBOR, Ted Spread), and other financial discussed herein. Similarly, it should be appreciated that a financial performance metric, e.g., of an asset, may comprise any financial performance metric of an asset, such as a profit, earnings, dividend, or other financial metric, e.g., measured over one or more periods of time.

In some embodiments, various systems and methods are provided for creating, displaying, editing, and managing a financial instrument. The financial instrument may be created, edited, managed, or issued in accordance with one or more transactions, e.g., a loan-type transaction for funding an acquisition or other transaction, such as a purchase of one or more properties, one or more businesses, one or more financial instruments, and/or one or more other assets. One or more parties may be parties to the financial instrument. For example, the financial instrument may comprise a contract and/or agreement between at least one lending party and at least one owning and/or borrowing party. It will be appreciated that one or more loaning parties and one or more owning and/or borrowing parties may be party to the financial instrument respecting a transaction or group of transactions, and that one or more financial instruments may be created, revised, or managed in connection with a single transaction.

For purposes of providing a clear description, this description may refer to a single transaction (e.g., a purchase transaction) wherein the financial instrument is created or modified so that a single purchaser (e.g., ABC Co.) and a single lender can acquire a business (e.g., a "Company," e.g., that operates on a property owned by the Company), wherein the financing agreement is defined by a financial instrument according to various embodiments of the invention. Accordingly, for purposes of this description, the one or more lending parties may be collectively be referred to as the "Lender," and the one or more owning and/or borrowing parties may be referred to as the "Investor" (e.g., ABC Co.). It should be appreciated that while an Investor may be deemed to be the "owner" (or borrower) with respect to a business or other asset financed at least in part using a financial instrument of the present invention, the Lender may own some equity and/or other financial interests in the business pursuant to the terms of the Financial Instrument. A financial instrument according to various embodiments of the present invention may be referred to herein as a "Financial Instrument."

The Financial Instrument may specify and/or define (e.g., by contract) one or more types of equity interest to be owned, e.g., at various different times during the term of the Financial Instrument, by the Lender and the Investor. The financial instrument may have a debt component, an equity component, both an equity and a debt component, and in some embodiments one or more other financial components. The financial instrument may specify a full or partial conversion of one component of the Financial Instrument (e.g., debt) into another component (e.g., equity). For example, the financial instrument may provide for the conversion of a portion of loan into equity owned by the Lender upon one or more conditions, such as one or more performance parameters of the Company at one or more different times. Accordingly, the percentage of equity owned by the Lender and Investor may change at different times based on such criteria, e.g., according to the performance of the Company at different times (e.g., as measured by one or more criteria, e.g., EBITDA for the last twelve months at various year-end points during the term of the financial instrument, and/or other criteria).

In some embodiments, the Financial Instrument may replace an existing financial instrument (existing prior to the formation, generation, execution, applicability of, or other time associated with the Financial Instrument). For example, the Financial Instrument may be created and/or executed pursuant to a restructuring of a pre-existing loan with another party. For example, the Financial Instrument may be created to replace a loan on an asset (such as a business) wherein an owner of the asset may be unable or unwilling to repay the loan. In some embodiments, the Financial Instrument may be a modification of an existing financial instrument such as a loan. For example, the Financial Instrument may be a refinanced loan, e.g., wherein a borrower wishes to keep the loan but restructure some of the loan terms such as interest rate.

In some embodiments, one or more terms or features of the Financial Instrument may change based on one or more factors, conditions, and/or other criteria. The factors, conditions, and/or other criteria may include any one or more of the following, e.g., as measured at one or more specific future times (e.g., a specific number of months or years into the term of the Financial Instrument such as six months, one year, two years, five years, ten years, etc.): performance parameters (e.g., financial performance parameters of a Company such as revenue, EBITDA, sales), market conditions (e.g., interest rate, LIBOR, Ted Spread, prevailing mortgage rates, T-bill prices), performance of the terms of the Financial Instrument (e.g., history of payments made on a Financial Instrument loan, such as percentage of payments made on time and/or total amounts paid compared with amounts owed as of one or more times), and/or other criteria. For example, one or more terms of the Financial Instrument, such as a pro forma amount of the loan and an amount (e.g., percentage) of equity provided to the Lender (e.g., at a particular time), may depend and/or may change (e.g., over time) based on a Company's performance (e.g., EBITDA as measured at one or more particular times, such as each year for five years, or any other performance parameter discussed herein).

In some embodiments, a processor may generate and transmit information associated with a Financial Instrument. For example, a processor may generate terms of the Financial Instrument, such as coupon rate, performance parameters or benchmarks, equity and loan amounts under various scenarios (such as an equity/loan chart showing equity and loan amounts under various company performance scenarios), and/or any and all of the types of information shown in the various FIGURES in this application. This information may be transmitted (e.g., electronically via email or other electronic communication) to one or more users, e.g., the Company, Purchaser, Lender, and/or one or more users associated therewith. In some embodiments, the information may be generated based on information received from a user (e.g., a representative of the Lender).

In some embodiments, a processor may enable one or more users to input various information (e.g., various terms of the Financial Instrument). The processor may receive information (e.g., financial information such as LIBOR, published mortgage rates, T-bill prices, and other financial information) from other sources, such as data feeds and websites. For example, the processor may periodically update information used to determine one or more terms of the Financial Instrument.

The processor may generate a schedule of information (e.g., such as those shown in the FIGURES), e.g., based on information received from users and other sources. The processor may transmit the information or otherwise cause the information to be output, e.g., at a display screen of one or more users. One or more users may modify one or more input parameters to modify the schedules. Such information may be updated in real time on the display screens of each user, e.g., during a Financial Instrument configuration session. In some embodiments, a processor may output one or more terms associated with the Financial Instrument such as a contract (e.g., including terms specified by the one or more users users) defining the Financial Instrument (e.g., including a payment schedule and a schedule of possible equity/loan splits). In some embodiments, one or more users may execute the contract (e.g., by signing with a digital signature) via the processor over a computer network. The processor may transmit a confirmation that the contract has been executed by one or more parties to the contract. For example, the processor may output a copy of the executed contract to the parties to the contract, e.g., via email or other electronic transmission.

FIGS. 1-4 depict an exemplary embodiment of a Financial Instrument according to various embodiments of the invention. Various embodiments of the invention are exemplified by one or more of FIGS. 1-4, and as a whole FIGS. 1-4 illustrate one exemplary embodiment.

An exemplary term sheet for a financial instrument according to at least one embodiment of the systems and methods disclosed herein may include the terms, conditions, and specifications described below. The terms identified below may apply to a single embodiment of the invention that is illustrated in FIGS. 1-4.

Term: 10 years with two (2) five-year extensions; Services: All strategic direction, positioning, marketing, and other management services, as well as oversight of any development or redevelopment of the property; termination: only in event of significant under performance relative to agreed budget/forecast, after appropriate cure period and other TBD provisions; Base Fee: 1% of gross revenues; Incentive Fees: 1% of gross revenues in excess of $175 million, plus 5% of EBITDA in excess of $25 million.

The initial capitalization and deal structure for the exemplary Financial Instrument may be defined at least in part by the following terms and specifications:

Lender to convert pre-existing loan to a new Financial Instrument: (1) $400 million new loan ("Reverse Convertible loan" or "RC Loan"); (2) 20% diluted common equity interest. (It should be appreciated that although various embodiments may be described with reference to a Reverse Convertible loan or "RC Loan," in some embodiments a conversion of the loan may be mandatory or at least provided under certain circumstances (e.g., based on various triggering conditions set forth in an agreement), in various embodiments a loan need not be converted. It should also be appreciated that in some embodiments, the terms of the RC Loan may specify that conversion of the loan (as described below) is mandatory, e.g., predetermined prior to the conversion date such as on the original date of execution of the Loan. In some embodiments, conversion of the loan may not be mandatory but may be at the option of one or more of the parties, such as at the option of the party who will obtain equity upon conversion, or in other embodiments at the option of the party providing equity.)

ABC Investment Co. to invest 25 million as preferred equity in Company, which converts to 80% common equity on a 1-to-1 basis. (In should be appreciated that in some embodiments, the financial instrument from the initial investment (here, preferred equity) may not convert to another financial instrument (such as common equity), but rather may remain in its initial form.)

RC loan to have the following features: (1) Coupon of 2.5% for first year, thereafter resets on a quarterly basis based on actual LTM (Last Twelve Months) performance (see table in FIG. 3); (2) Term of 10 years, wherein (a) Initial 5 years (the RC Loan Measurement Date), at which point partial equity conversion may occur; and (b) 5 years thereafter at the then-prevailing coupon; and (3) Conversion at RC Loan Measurement Date per then-effective LTM EBITDA (see table in FIG. 4).

The RC Loan will have a variable interest rate: (1) First 12 months: 2.5%; (2) Thereafter, adjustable quarterly based on the LTM EBITDA of the business (until year 5), wherein rate increases 25 bps for every $5 million improvement in EBITDA (over $25 million); (3) Years 6-10, rate remains at the rate prevailing at the RC Loan Measurement Date.

It should be appreciated that the RC loan described above may be used to convert a pre-existing loan that has coupon far in excess of the actual value of the underlying assets, e.g., due to poor performance by the Company, poor economic conditions, or other causes. Accordingly, the Lender may seek to convert or modify the loan, e.g., as part of a restructuring. In some embodiments, such modification or restructuring may occur to avoid a bankruptcy proceeding. In some embodiments, a Financial Instrument such as the one described in FIGS. 1-4 (e.g., having the terms described above) may incorporate terms that specify how to modify various terms (e.g., equity percentages and interest rates) under various business performance metrics or conditions or market conditions at a future time, e.g., similar to terms that may have been determined at such future time by a negotiation between similarly situated parties at that time, or according to what a bankruptcy court may determine in a restructuring.

FIG. 1 depicts an exemplary effective coupon for a financial instrument according to at least one embodiment of the systems and methods described herein, e.g., for a financial instrument having the terms described above.

FIG. 2 depicts an exemplary conversion test for a financial instrument according to at least one embodiment of the systems and methods disclosed herein.

FIG. 3 depicts an exemplary valuation at various break points for a financial instrument according to at least one embodiment of the systems and methods disclosed herein. For example, each column shows a financial picture of Financial Instrument and the economics between the parties for different values of Company EBITDA over the last twelve months (LTM) as measured at year 5. (Such measurement and variable conversion into equity at year 5 is specified in the terms of the Financial Instrument, as described above.) Here, the value of the enterprise (ABC) as measured at year 5 is considered to be eight times the last twelve months EBITDA (as measured at year 5). Thus, in the far right-hand column, the value of ABC is determined to be 640 (e.g., 640 million) based on an LTM EBITDA at year five of 64 million. The pro forma debt in such circumstance is 400 million, and so the remaining equity value is $240 million ($640 million minus $400 million debt). ABC Investment company owns $192 million of that equity, and Lender owns $48 million. One of ordinary skill can appreciate that contrary to many traditional loan structures, the pro forma debt on the chart is highest ($400 million) when Company ABC performs the best in year 5 (highest EBITDA in year 5), and lowest (S 125 million) when Company ABC performs worst in year 5 ($25 million EBITDA in year 5).

The total economics values are a comparison of the equity owned by ABC Investment Co. to the Lender's total economics (e.g., the $25 million paid to Lender by ABC Co. on day 1, the pro forma debt, and the Lender's equity.) One of skill in the art will appreciate that the total economics values in the chart of FIG. 3 do not take into account debt paydown/accumulation of cash balance over five-year period, or the benefit of interest payments.

One of skill in the art will appreciate that if the Company is a significantly underwater asset held by Lender before converting the loan to the exemplary Financial Instrument, then the Financial Instrument of the present example may result in superior total recovery for the Lender relative to a more traditional structure described below, and may help the Lender to avoid a significant writedown of debt/investment for the Lender.

FIG. 4 depicts an exemplary comparison of various deal structures including a deal structure based on a financial instrument according to at least one embodiment of the systems and methods disclosed herein.

In comparison to the terms of the exemplary Financial Instrument described in FIGS. 1-3, a more conventional approach to replacing an existing loan by a Lender might envision a reduction in debt to a level of $125-150 million, plus a $25 million new investment for a 50% economic equity interest. Such conventional approach may result in a greater loan writedown by the Lender. Such a large writedown by the Lender may result in inferior economics for the Lender. In contrast, the exemplary Financial Instrument described in FIGS. 1-3 may result in a smaller writedown by the Lender. For example, as shown in FIG. 3, under the structure of the exemplary Financial Instrument, the Lender captures up to $58 million more of value/recovery relative to such "standard" approach.

It should be appreciated that in other embodiments (not defined in FIGS. 1-4), the terms and conditions for a different exemplary Financial Instrument may be different from those specified above. For example, such other Financial Instruments may not convert or replace a pre-existing financial instrument such as a loan, but rather may be created independently of any other loan or financing instrument. The financial instrument may be in any dollar value, or may be specified in a values or partial values other than a currency, such as in shares of stock, bonds, or other financial instruments, real property, and/or other assets. The Financial Instrument may or may not have one or more Investors or Owners, and any such Investor may or may not receive equity or another interest in the Company. Such equity or other interest may or may not convert into another interest in the Company or other entity (or cash). The Financial Instrument may have a fixed or variable coupon according to a variety of different pre-defined or variable schedules and coupon rates, and any such variable rate may reset at a variety of different times or upon the occurrence of a variety of different conditions, such as achieving specific financial performance metrics. The Financial Instrument may or may not convert in whole or in part into equity in the Company at one or more different times and/or upon one or more different conditions, e.g., financial market or performance conditions. The Financial Instrument may have a fixed or variable interest rate determined based on one or more conditions or performance metrics.

Accordingly, various embodiments of the invention may comprise one or more processors that create, modify, display, or transmit to various parties (such as Lender and Investor), and/or enable such parties to specify, information about a Financial Instrument as described herein. For example, a method according to various embodiments of the invention is provided wherein one or more of the following actions take place: information about the financial instrument is received, e.g., from a Lender and/or Investor; information about the financial is modified, e.g., by a processor, e.g., at the request of a Lender and/or Investor; terms of a financial instrument are determined based on such information; information about the financial instrument is output at a display device, e.g., to the Lender and/or Investor; the terms are modified based on inputs by the Lender and/or Investor; the processor modifies the terms of the financial instrument and outputs such terms on the display device; indication of acceptance of the terms is received from the Investor and Lender; the financial instrument is generated; information about the Financial Instrument is output to the Lender and Investor, e.g., such as information similar to that shown in FIGS. 1-4.

In another embodiment, an apparatus comprising a processor is configured to perform such method based on instructions stored on a memory electronically coupled to the processor.

ALTERNATIVE TECHNOLOGIES

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the claims herein.

What is claimed is:

1. An apparatus comprising:
 a memory;
 a network interface;
 at least one processor to:
  receive, via the network interface, performance parameters associated with an asset;
  receive a request to generate data indicative of a financial instrument comprising a funding instrument that specifies rights and obligations of at least a first party and a second party respecting a funding contribution from the first party for funding the asset owned at least in part by the second party;
  determine a plurality of possible measurements of a future performance of the asset based at least partially on the performance parameters;
  determine a conversion schedule for converting at least some rights of the first party in the financial instrument into an equity component of the asset, in which the conversion schedule specifies a possible post-conversion equity component for each of the performance measurements, such that the conversion schedule specifies a greater possible post-conversion equity component for a greater possible performance measurement;

transmit the conversion schedule to the second party;

receive an indication that the first and second party agree to terms of the financial instrument;

transmit to the second party a confirmation of acceptance of the financial instrument;

after transmission of the confirmation of acceptance, determine a performance of the asset according to the terms of the financial instrument;

determine a post-conversion amount based on the performance of the asset according to the conversion schedule;

transmit data to the second party indicative of a contract comprising the financial instrument has been executed;

receive, from input devices of computing devices of users, data representing input parameters and modifying the conversion schedule based on the received data representing input parameters;

update the performance parameters on display screens of computing devices of users.

2. The apparatus of claim 1, in which the at least one processor is further configured to: transmit data to the second party indicating that the contract comprising the financial instrument has been executed.

3. The apparatus of claim 1, in which the conversion schedule further indicates a future time upon which the performance of the asset will be measured.

4. The apparatus of claim 1, in which the financial instrument specifies that some of rights of the first party automatically convert to a post-conversion equity component according to the conversion schedule if, at a future time, the asset satisfies a given performance metric.

5. The apparatus of claim 1, in which the financial instrument specifies that some of rights of the first party convert to a post-conversion equity component according to the conversion schedule if both (a) at a future time, the asset satisfies a given performance metric and (b) the first party converts some of the rights of the first party into the post-conversion equity component.

6. The apparatus of claim 1, in which the financial instrument specifies that some of rights of the first party automatically convert to a post-conversion equity component according to the conversion schedule if, at a predetermined future time, the asset satisfies a given performance metric.

7. The apparatus of claim 1, in which the financial instrument specifies that some of rights of the first party automatically convert to a post-conversion equity component according to the conversion schedule upon an occurrence of the asset satisfying a predetermined performance metric.

8. The apparatus of claim 1, in which the financial instrument specifies that some of rights of the first party automatically convert to a post-conversion equity component according to the conversion schedule upon an occurrence of one or more predetermined market conditions.

9. The apparatus of claim 1, in which the performance parameters are based on potential measurements of asset earnings at one or more future times, the future times being determined prior to execution of the contract comprising the financial instrument.

10. The apparatus of claim 1, in which the financial instrument comprises a loan component wherein the first party is a lender of funds and the second party is a borrower.

11. The apparatus of claim 1, in which the conversion schedule further specifies a post-conversion debt component owed by the second party to the first party after the converting.

12. The apparatus of claim 1, in which the post-conversion amount comprises equity that may be converted from at least a portion of a loan component upon an election of the first party after an occurrence of a corresponding possible performance measurement.

13. The apparatus of claim 1, in which the post-conversion amount comprises equity that will automatically be converted from at least a portion of a loan component as a result of an occurrence of a corresponding possible performance measurement.

14. The apparatus of claim 1, in which the equity component comprises common stock in the asset.

15. The apparatus of claim 1, in which the equity component comprises preferred stock in the asset.

16. The apparatus of claim 1, in which the equity component comprises preferred stock in the asset, in which the preferred stock is configured to receive dividend payments from the second party after converting.

* * * * *